(12) United States Patent
Wendt et al.

(10) Patent No.: US 10,218,859 B1
(45) Date of Patent: Feb. 26, 2019

(54) SECURED PRE-PAYMENT FOR PORTABLE COMMUNICATION UNIT

(71) Applicants: Peter D. Wendt, Peoria, AZ (US);
Daniel S. Karvonen, Mankato, MN (US)

(72) Inventors: Peter D. Wendt, Peoria, AZ (US);
Daniel S. Karvonen, Mankato, MN (US)

(73) Assignee: Precis Group LLC, Dover, DE (US)

( * ) Notice: Subject to any disclaimer, the term of this patent is extended or adjusted under 35 U.S.C. 154(b) by 0 days.

(21) Appl. No.: 15/999,139

(22) Filed: Aug. 17, 2018

Related U.S. Application Data

(63) Continuation of application No. 15/805,081, filed on Nov. 6, 2017, now Pat. No. 10,057,432, which is a continuation of application No. 15/390,325, filed on Dec. 23, 2016, now Pat. No. 9,813,564, which is a continuation of application No. 09/559,272, filed on Apr. 27, 2000, now abandoned.

(51) Int. Cl.
| | |
|---|---|
| *H04M 11/00* | (2006.01) |
| *H04M 17/00* | (2006.01) |
| *G06Q 20/40* | (2012.01) |
| *G06Q 20/28* | (2012.01) |
| *G06Q 20/32* | (2012.01) |

(52) U.S. Cl.
CPC ......... *H04M 17/302* (2013.01); *G06Q 20/28* (2013.01); *G06Q 20/3223* (2013.01); *G06Q 20/4037* (2013.01)

(58) Field of Classification Search
USPC .................. 705/44, 37, 14.7, 36 R; 455/406; 379/114.01
See application file for complete search history.

(56) References Cited

U.S. PATENT DOCUMENTS

| | | |
|---|---|---|
| 5,909,485 A | 6/1999 | Martin et al. |
| 5,920,647 A | 7/1999 | Kolling et al. |
| 5,983,091 A | 11/1999 | Rodriquez |
| 6,282,573 B1 | 8/2001 | Darago et al. |

(Continued)

*Primary Examiner* — David Q Nguyen
(74) *Attorney, Agent, or Firm* — IPTechLaw

(57) ABSTRACT

In a method of payment for service of a portable communication unit, a customer prepays a dealer for said service, the dealer forwards transaction order information about the pre-payment to a prepaid management center (PMC); and the PMC provides a bank the transaction order information. The bank, upon receipt of the transaction order information from the PMC, determines whether there are sufficient funds in the dealer account to cover the transaction. If there is insufficient cash on hand, the dealer is notified and is provided an opportunity to replenish the account so that the transaction may proceed. If there are adequate funds in the dealer account, the bank automatically transfers the amount of the purchase transaction in the SP S account, less the dealer's fee for the purchase. After funds are transferred from the dealer account, the PMC is notified of the transfer, at which time the PMC generates codes and issues the codes to the dealer. The dealer transfers the codes to the user and the user enters the codes into the unit. On a regular basis the bank electronically transfers funds from the SPS account into accounts held by parties entitled to receive the funds.

9 Claims, 3 Drawing Sheets

(56) References Cited

U.S. PATENT DOCUMENTS

| | | | |
|---|---|---|---|
| 6,434,535 B1 | 8/2002 | Kupka et al. | |
| 7,716,080 B2 * | 5/2010 | Postrel | G06Q 20/105 |
| | | | 705/14.27 |
| RE43,246 E * | 3/2012 | Bent | G06Q 40/02 |
| | | | 705/36 R |
| 9,813,564 B1 * | 11/2017 | Wendt | H04M 17/302 |
| 10,057,432 B1 * | 8/2018 | Wendt | H04M 17/302 |
| 2001/0000777 A1 * | 5/2001 | McGregor | H04M 15/00 |
| | | | 455/406 |
| 2003/0026404 A1 | 2/2003 | Joyce et al. | |
| 2006/0287943 A1 * | 12/2006 | Postrel | G06Q 20/06 |
| | | | 705/37 |
| 2013/0024379 A1 * | 1/2013 | Di Tucci | G06Q 20/10 |
| | | | 705/44 |

* cited by examiner

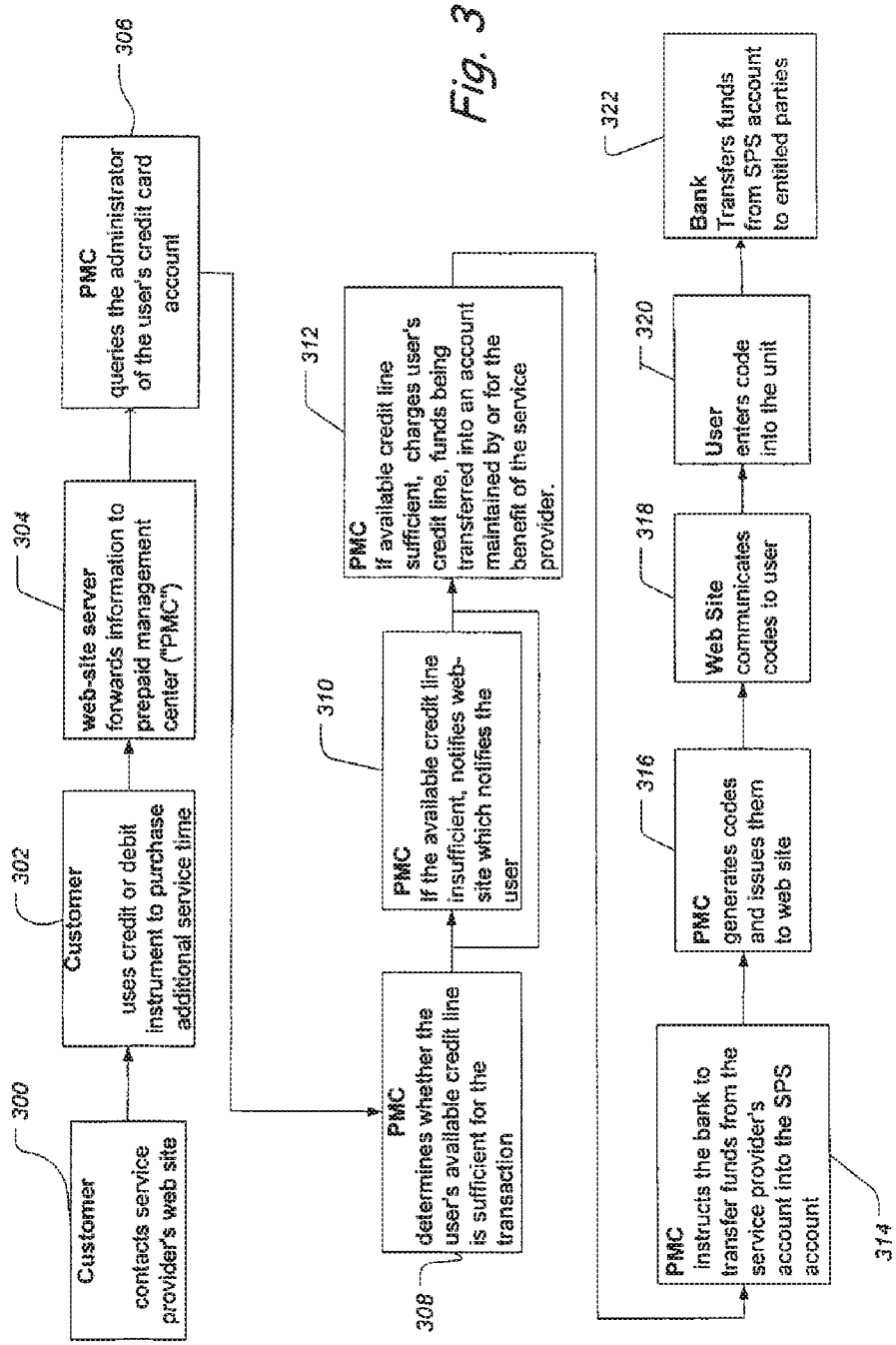

SECURED PRE-PAYMENT FOR PORTABLE COMMUNICATION UNIT

CROSS REFERENCE TO RELATED APPLICATIONS

This application is a continuation application of the earlier U.S. Utility Patent Application to Peter D. Wendt and Daniel S. Karvonen entitled "Secured pre-payment for communication unit," application Ser. No. 15/805,081, filed Nov. 6, 2017, now pending; which is a continuation application of the earlier U.S. Utility Patent Application to Peter D. Wendt and Daniel S. Karvonen entitled "Secured pre-payment for communication unit," application Ser. No. 15/390,325, filed Dec. 23, 2016, now pending; which was is a continuation application of the earlier U.S. Utility Patent Application to Peter D. Wendt and Daniel S. Karvonen entitled "Secured pre-payment for communication unit," application Ser. No. 09/559,272, filed Apr. 27, 2000, now abandoned, the disclosure of which is hereby incorporated entirely herein by reference.

BACKGROUND

1. Technical Field

This invention relates to a payment system, and more particularly, to a secure prepayment system for portable communication units that operate based upon discrete allocable blocks of service time.

2. Background Art

The advent of portable communications devices, including cellular telephones and other hand-held computing devices with wireless capabilities, has vastly increased over the last few years. It is currently estimated that there are over sixty million Americans owning and operating cellular telephones. However, because of the inherent mobility of portable communications devices, it is easy for them to be stolen. Theft of a portable communication service, particularly cellular telephone service, represents a major problem to the telecommunication industry. If a user can establish that service was unauthorized, the service provider loses revenue for the unauthorized service.

It is also easy for cellular telephones, as with regular telephones, to be used beyond the credit capacity of their owners. For this reason, most providers of cellular service require users to have a good credit history in order to obtain services.

Cellular telephone service providers therefore exclude as potential clients a potentially large segment of the population rather than assume a risk of loss, either due to theft or overuse.

SUMMARY

It is desirable to provide portable communication service to a larger segment of the population than is presently being served. More specifically, it is desirable to provide a portable communication system which allows users with insufficient or poor credit history to purchase service.

In addition, it is desirable to provide a system where individuals and entities can maintain tighter cost controls by limiting users to a fixed allocation of service time.

It is desirable for service providers to receive payment in advance of the actual provision of services to receive the time-value benefit of the payments.

It is desirable for service providers to receive prepayment to eliminate problems with accounts receivable due to failure to pay either by users or by dealers who fail to forward collected funds to the service providers.

This invention addresses and overcomes the limitations of prior systems, by providing a unique portable communication system which comprises, in conjunction, a unique portable communication unit that may be easily configured to provide portable communication services in discrete predetermined blocks of service time, along with a secure system of prepayment for use of the communication unit and service time.

In accordance with a preferred embodiment of this system, the user pays before any service time is transferred to the user. Funds representing the prepayment are transferred to a secure fiduciary bank account from which the funds are later disbursed to the parties entitled to receive them. Only after the funds have been transferred to the fiduciary account is the user provided with codes which activate blocks of service time on the user's portable communication unit.

Thus this system of payment insulates the prepaid funds for the benefit of all the parties entitled to receive a share of the funds.

In some preferred embodiments of this invention, a dealer provides authorization in the form of an authorization code which is entered into the unit and which, upon validation by the unit, activates service time. In addition to the above, this system protects the proprietary method of code generation from unnecessary exposure to third parties. At the same time the system also renders the generation of the codes essentially invisible to the user. This strengthens the relationship between the service provider (or dealer) and the user, and minimizes the churning that is a problem in the telecommunication industry.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 3 illustrates the flow of the pre-payment system according to another embodiment of the present invention.

DESCRIPTION

Figure 1:
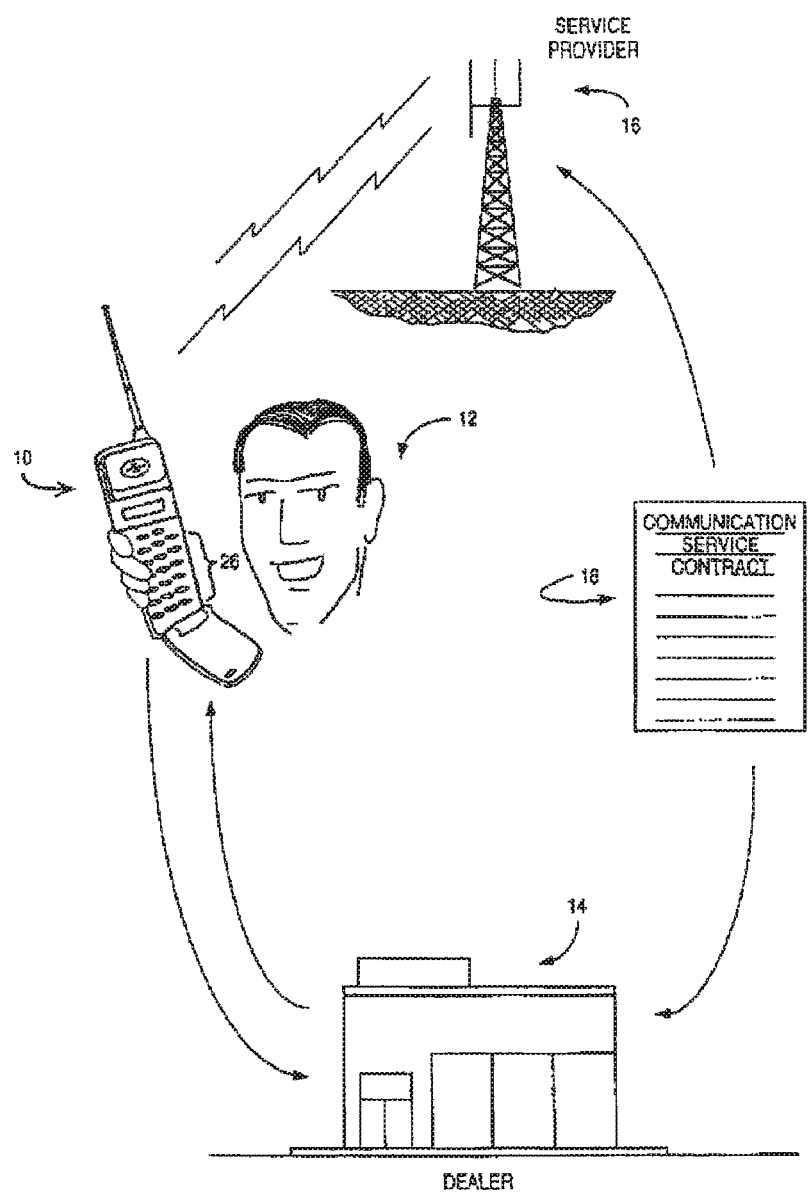
FIG. 1 illustrates a graphical representation of one general environment for use of the present invention.

With reference to FIG. 1, a portable communication unit user/customer 12 may obtain a portable communication unit 10, for example, from a dealer 14 or similar provider of such equipment, such as a telephone service provider, a vending machine, a rental outlet, a manufacturer or a virtual point of sale. Alternatively, the user 12 may separately purchase a portable communication unit 10 and enter into an agreement (e.g., communication service contract 18 for service with a dealer 14 or directly with the service provider 16). The portable communication unit 10 is such as the one described in detail in U.S. Pat. No. 5,983,091 title "Portable Communication Unit with Discrete Allocable Blocks of Airtime," dated Nov. 9, 1999, the contents of which are incorporated herein by reference. The portable communication unit 10 may be a cellular telephone or a digital communication system having voice, audio, data and/or image communication capability, such as a hand-held computing device with wireless capability or a wireless MP3 device.

In some environments, the portable communication service user 12 contacts a dealer 14 that offers the sale or use of a unit 10 in accordance with the present invention. Upon initial purchase or rental of a unit 10 or upon initial activation of portable communication service, the user 12 will be able to use the unit 10 for a predetermined, yet limited amount of service time. For example, the unit 10 may have one block of service time available so a user 12 may be able to use the unit 10 for an aggregate of forty-five minutes of service time. After the current block of service time has been used, according to one arrangement, the user 12 may contact the dealer 14 to obtain authorization for another block of service time.

Figure 2:
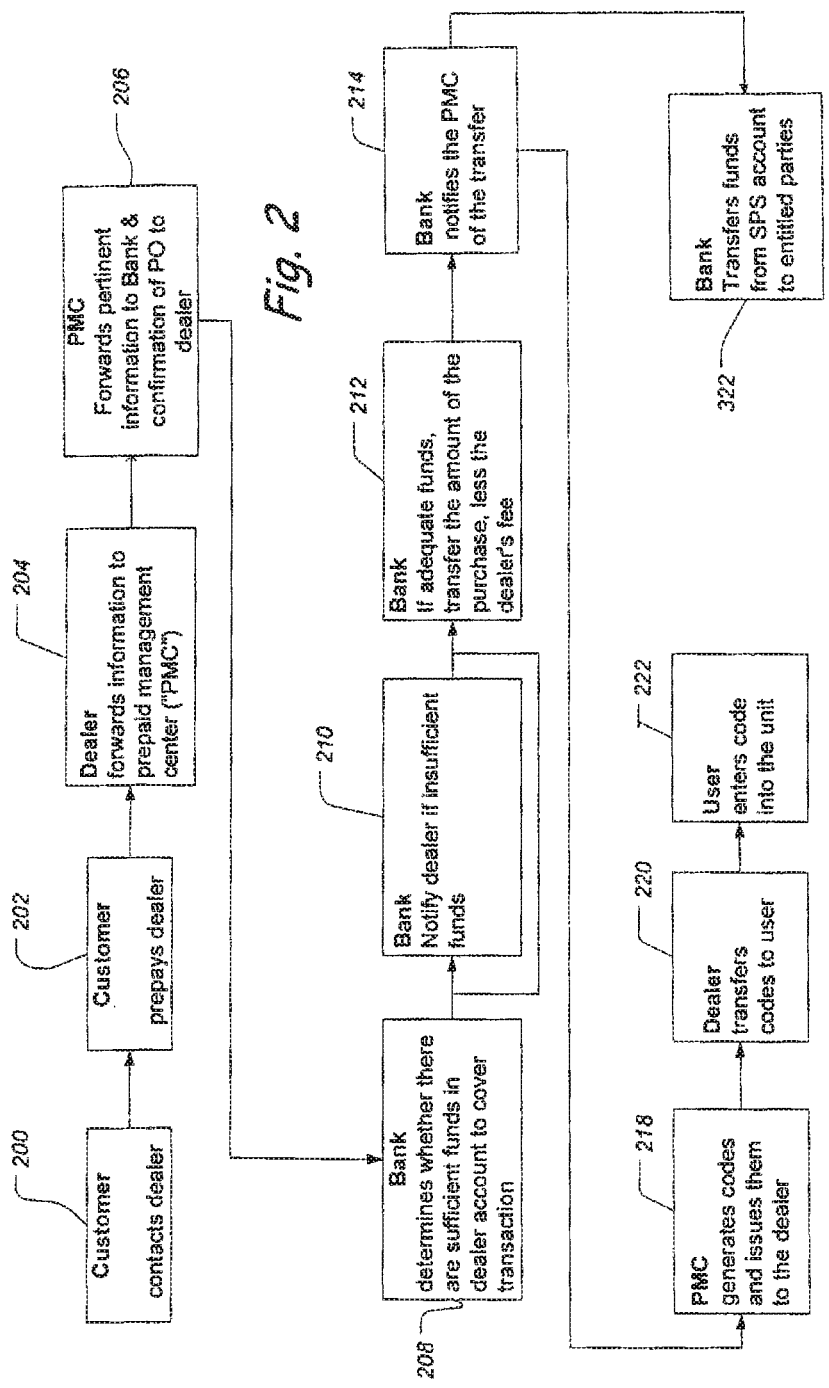
FIG. 2 illustrates the flow of the pre-payment system according to an embodiment of the present invention.

The dealer 14 provides the authorization in the form of an authorization code which is entered into the unit 10 and which, upon validation by the unit 10, activates the newly purchased service time. In preferred embodiments of this invention, the dealer 14 requires the user 12 to prepay for service time before providing the user 12 with authorization codes for additional time. The authorization codes themselves are generated by a prepaid management center ("PMC") which provides the codes to the dealer. In some preferred embodiments, codes are generated in the manner described in U.S. Pat. No. 5,983,091. The secure payment system of a preferred embodiment of this invention operates as follows (with reference to FIGS. 1-2).

When requiring new service or additional service time, the user 12 contacts a dealer 14 to purchase authorization codes for service time (at 200). This contact may be in person, by telephone, or over the Internet. At this time the user 12, either by choice or as required by the user's contract 18 with the dealer 14, prepays the dealer an amount for a block of service time (at 202). Dealers may sell service time in blocks of fixed size, e.g., 30, 60 and 120 minute blocks. In addition, dealers may distinguish between different kinds of service time, e.g., local airtime, domestic roaming airtime and international airtime.

When the user 12 has prepaid the dealer 14 for the service time, the dealer 14 forwards (at 204) to a prepaid management center ("PMC") the information of the service time purchase, including the amount of service time purchased and the Electronic Serial Number ("ESN") or other unique identifier particular to the portable communication unit 10. In some preferred embodiments, the ESN is a serial number which is unique to each portable communication unit 10, such as described in U.S. Pat. No. 5,983,091.

When the PMC receives the information concerning the purchase of service time, the PMC forwards (at 206) pertinent information to a bank or other financial institution capable of maintaining depository accounts. The bank has an account established by the dealer 14, and it also has a secured payment system ("SPS") account. In a preferred embodiment of the invention, the bank also has accounts established by other dealers, by the PMC and by one or more service providers of various types, such as wireless, land line, and long distance. However, these other accounts may be established at financial institutions other than the bank.

Upon receipt of the transaction information from the PMC, the bank, acting as a fiduciary, determines whether there are sufficient funds in the dealer account to cover the purchase transaction (at 208). If there is insufficient cash on hand, the dealer 14 is so notified (at 210) and given an opportunity to replenish the account so that the transaction may proceed. In a preferred embodiment of this invention, each dealer account has a pre-determined minimum balance to prevent inadvertent cash deficiencies.

If the bank determines that there are adequate funds in the dealer account, the bank automatically transfers (at 212) the amount of the purchase transaction in the SPS account less the dealer's fee for the purchase. The bank is aware of the dealer's fee arrangement for each dealer account.

After the funds are transferred from the dealer account, the bank notifies the PMC of the transfer (at 214). The PMC at this time generates codes and issues them to the dealer (at 218). The dealer 14 then transfers the codes to the user 12 (at 220) and the user enters the code into the unit 10 (at 222), thus increasing the amount of available service time with the device. A preferred manner in which the codes are generated and in which the service time is added to the device is described in detail in U.S. Pat. No. 5,983,091. On a regular basis, e.g., daily, the bank electronically transfers funds from the SPS account into accounts held by parties entitled to receive the funds, which may include the dealer, the PMC, one or more service providers, and sales entities (at 322).

In an alternative embodiment of this invention, e.g., as shown in FIG. 3, the user 12 has a direct relationship with the service provider, and the service provider maintains a web-site devoted to the sale of additional units of service time. To purchase additional service time, the user 12 contacts the web-site (at 300) and uses a credit card or other similar debit or credit instrument to purchase (at 302) additional service time. In this embodiment, the web-site server forwards the transaction information to the PMC (at 304), the PMC queries the administrator of the user's credit card account (at 306) and determines whether the user's available credit line is sufficient for the transaction (at 308). If the available credit line is insufficient, then the PMC so notifies the web-site which in turn notifies the user 12 (at 310). If the available credit line is sufficient, then the PMC, charges the user's credit line (at 312) the appropriate amount with the funds being transferred into an account maintained by or for the benefit of the service provider. The PMC also instructs the bank (at 314) to transfer funds from the service provider's account into the SPS account. The PMC (at 316) then generates the codes and issues them to the web-site server, which in turn communicates the codes (at 318) to the user 12. The user 12 then enters the codes into the unit 10 (at 320). On a regular basis, e.g., daily, the bank electronically transfers funds from the SPS account into accounts held by parties entitled to receive the funds, which may include the dealer, the PMC, one or more service providers, and sales entities (at 322).

This procedure alleviates concerns about future reversals of credit card charges. Alternatively, the funds could be transferred directly from the credit card account into the SPS account.

When a credit card account is used, the account could be charged automatically on a periodic basis, with the new codes being made available to the user 12 by telephone, e-mail or web-site. The procedure would be useful, for example, for parents of a college student who wish to make a pre-determined and limited amount of communication service available to the student.

Each portable communication unit 10 is identified and linked to its home service provider. Thus, when the PMC issues codes to the user 12 via the dealer 14 or the service provider web-site, the PMC also notifies the service provider of the sale of service time. When the user 12 uses the unit 10, the software in the communication unit 10 decrements the amount of service time spent for that communication session. The specific cost for service time, and division of service time between home time, roaming time, international time, etc., is determined by the carrier associated with that particular phone. From the perspective of the carrier, there is little risk of overuse of the phone because the phone is programmed to stop functioning when the prepaid service time has been used up. At regular intervals, e.g., daily, the bank electronically transfers funds from the SPS account into the dealer account, the service provider account, and the PMC account.

Note that the various transactions described above, including those performed by the bank and/or the PMC are preferably computerized. In addition, the transfer of information can be done with encryption and/or a virtual private network, thus increasing the security of the overall system. Further, the various parties (e.g., the banks, dealers, PCM, and SPS) may produce routine or specialized reports relating to the service. Thus, in some aspects, this invention provides computerized record-keeping systems that track and record transactions of various methods of prepayment for service of portable communication units. In addition, preferably the computerized record-keeping system produces reports of such transactions and of the status of related financial services.

The codes may also be purchased at the same time the communication unit 10 itself is purchased. For example, a customer 12 may purchase a telephone unit from a vending machine with time already loaded into the phone. In that case, the information regarding the sale of the service time will be electronically retrieved from the vending machine on the day of sale of the telephone unit, and funds can be disbursed from the SPS account that same day. If the telephone unit is sold to a dealer 14 with service time pre-loaded, then the funds will be disbursed from the SPS account on the day the telephone is sold or delivered to the dealer 14. In these instances, there will be no need for the PMC to generate and issue codes at the time of sale because the codes will have been previously generated and pre-loaded into the phone.

While the present invention has been described with reference to providing a prepayment system for cellular telephones, the methods, systems and devices of this invention are considered to be general constructs covering other prepayment systems.

In addition, just as the described secure prepayment system allows a user to obtain a code which, through keypad entry, activates discrete allocable blocks of communication service, such as cellular telephone service, the same process allows the purchase of codes to activate other forms of service, such as stock market update service, computer games, utility service, highway toll service, etc.

Thus, are provided methods and systems for secured pre-payment for portable communication units. One skilled in the art will appreciate that the present invention can be practiced by other than the described embodiments, which are presented for purposes of illustration and not limitation, and the present invention is limited only by the claims that follow.

The invention claimed is:

1. A method of prepayment for service on a telecommunications system using a portable communication unit (PCU), the method comprising:
  receiving a prepayment from a customer at a dealer for service on a telecommunications system using a first telecommunication channel;
  receiving transaction order information at a prepaid management center (PMC) from a dealer about the prepayment by the customer to the dealer, the PMC receiving the transaction order information using a second telecommunication channel;
  providing a bank the transaction order information using a third telecommunication channel and the PMC;
  notifying the dealer using the third telecommunication channel if insufficient funds are determined to be in a dealer account at the bank and providing the dealer an opportunity to replenish the dealer account;
  if sufficient funds are determined to be in the dealer account, automatically transferring the amount of the transaction from the dealer account to a secure payment system (SPS) account using a fourth telecommunication channel, less a dealer's fee for the transaction;
  notifying the PMC using a fifth telecommunication channel in response to the funds transfer into the SPS account;
  generating codes using the PMC to enable the PCU to provide the service on the telecommunication system;
  transferring the codes to the customer using the first telecommunication channel for entry into the PCU by the customer;
  processing the codes using the PCU; and
  providing the service on the telecommunication system using the result of processing the codes by the PCU.

2. The method of claim 1, further comprising issuing the codes to the dealer using the PMC and a sixth telecommunication channel.

3. The system of claim 1, wherein the first telecommunication channel, the second telecommunication channel, the third telecommunication channel, the fourth telecommunication channel, the fifth telecommunication channel, and the sixth telecommunication channel are one of a telephone network and the Internet.

4. A method of prepayment for service on a telecommunications system using a portable communication unit (PCU), the method comprising:
  using a first telecommunication channel, receiving a prepayment from a customer at a dealer into a dealer account, the prepayment for service on a telecommunications system;
  receiving transaction order information at a prepaid management center (PMC) from a dealer about the prepayment by the customer to the dealer, the PMC receiving the transaction order information using a second telecommunication channel;
  transferring the amount of the prepayment from the dealer account to a secure payment system (SPS) account using a third telecommunication channel, less a dealer's fee for the transaction;
  notifying the PMC using a fourth telecommunication channel in response to the funds transfer into the SPS account;
  generating codes using the PMC to enable the PCU to provide the service on the telecommunication system;
  transferring the codes to the customer using the first telecommunication channel for entry into the PCU by the customer;
  processing the codes using the PCU; and
  providing the service on the telecommunication system using the result of processing the codes by the PCU.

5. The method of claim 4, further comprising issuing the codes to the dealer using the PMC and a fifth telecommunication channel.

6. The system of claim 5, wherein the first telecommunication channel, the second telecommunication channel, the third telecommunication channel, the fourth telecommunication channel, and the fifth telecommunication channel are one of a telephone network and the Internet.

7. A method of prepayment for service on a telecommunications system using a portable communication unit (PCU), the method comprising:
- using a first telecommunication channel, receiving a prepayment from a customer at a dealer, the prepayment for service on a telecommunications system;
- receiving transaction order information at a prepaid management center (PMC) from a dealer about the prepayment by the customer at the dealer, the PMC receiving the transaction order information using a second telecommunication channel;
- transferring the amount of the credit card prepayment to a secure payment system (SPS) account using a third telecommunication channel;
- notifying the PMC using a fourth telecommunication channel in response to the funds transfer into the SPS account;
- generating codes using the PMC to enable the PCU to provide the service on the telecommunication system;
- transferring the codes to the customer using the first telecommunication channel for entry into the PCU by the customer;
- processing the codes using the PCU; and
- providing the service on the telecommunication system using the result of processing the codes by the PCU.

8. The method of claim 7, further comprising issuing the codes to the dealer using the PMC and a fifth telecommunication channel.

9. The system of claim 8, wherein the first telecommunication channel, the second telecommunication channel, the third telecommunication channel, the fourth telecommunication channel, and the fifth telecommunication channel are one of a telephone network and the Internet.

* * * * *